(12) United States Patent
Sakamoto et al.

(10) Patent No.: US 6,937,764 B2
(45) Date of Patent: Aug. 30, 2005

(54) METHOD AND APPARATUS FOR DETECTING LOCAL FEATURES OF VIDEO, AND RECORDING MEDIUM STORING THE METHOD

(75) Inventors: Katsuto Sakamoto, Yokohama (JP); Junichi Hatooka, Yokohama (JP); Hirokazu Amemiya, Ebina (JP); Mitsuteru Omata, Ebina (JP); Yoshinobu Hagihara, Yokohama (JP); Toshihide Saga, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 10 days.

(21) Appl. No.: 10/649,953

(22) Filed: Aug. 28, 2003

(65) Prior Publication Data

US 2004/0046895 A1 Mar. 11, 2004

Related U.S. Application Data (63) Continuation of application No. 09/379,365, filed on Aug. 23, 1999, now abandoned.

(30) Foreign Application Priority Data

Aug. 24, 1998 (JP) .......................................... 10-236792

(51) Int. Cl.⁷ .............................. G06K 9/46; G06K 9/00; G06K 9/62
(52) U.S. Cl. ....................... 382/195; 382/165; 382/224
(58) Field of Search ................................. 382/107, 162, 382/165, 167, 195, 236, 305, 224, 190; 345/440; 386/52; 707/101, 200

(56) References Cited

U.S. PATENT DOCUMENTS

| | | | |
|---|---|---|---|
| 5,177,513 A | * 1/1993 | Saito | 352/129 |
| 5,428,774 A | 6/1995 | Takahashi et al. | 707/101 |
| 5,434,678 A | * 7/1995 | Abecassis | 386/52 |
| 5,568,275 A | * 10/1996 | Norton et al. | 386/52 |
| 5,572,728 A | 11/1996 | Tada et al. | 707/200 |
| 5,708,767 A | 1/1998 | Yeo et al. | 345/440 |
| 5,732,146 A | 3/1998 | Yamada et al. | 382/107 |
| 5,974,219 A | 10/1999 | Fujita et al. | 386/52 |
| 6,023,520 A | 2/2000 | Nagasaka et al. | 382/107 |
| 6,192,183 B1 | * 2/2001 | Taniguchi et al. | 386/52 |
| 6,256,419 B1 | 7/2001 | Nagasaka et al. | 382/236 |
| 2001/0005428 A1 | 6/2001 | Miyatake et al. | 382/165 |

FOREIGN PATENT DOCUMENTS

| | | |
|---|---|---|
| EP | 0 780 776 A1 | 6/1991 |
| EP | 0 438 299 A2 | 7/1991 |
| EP | 0 564 247 A1 | 10/1993 |
| EP | 0 810 794 A2 | 12/1997 |
| JP | 09-074575 | 3/1997 |
| JP | 10-126721 | 5/1998 |
| WO | WO 97/40454 | 10/1997 |
| WO | WO 98/23087 | 5/1998 |
| WO | WO 09/34182 | 8/1998 |

* cited by examiner

Primary Examiner—Mehrdad Dastouri
(74) Attorney, Agent, or Firm—Antonelli, Terry, Stout & Kraus, LLP (57) ABSTRACT

A method of detecting local features of video which includes the steps of: extracting a first static image and a second static image from a video made up of a plurality of static images; calculating a feature quantity of the first static image and a feature quantity of the second static image; detecting the second static image having a feature quantity such that a difference in feature quantity between the first static image and the second static image satisfies a predetermined condition; and displaying the second static image thus detected and the feature quantity difference in one-to-one correspondence.

9 Claims, 10 Drawing Sheets

METHOD AND APPARATUS FOR DETECTING LOCAL FEATURES OF VIDEO, AND RECORDING MEDIUM STORING THE METHOD

CROSS-REFERENCE TO RELATED APPLICATIONS

This application is a continuation of U.S. Ser. No. 09/379,365 filed Aug. 23, 1999, now abandoned, the entire contents of which are incorporated herein by reference.

BACKGROUND OF THE INVENTION

The present invention relates to a method and an apparatus for detecting and displaying local features of video and a recording medium storing the method.

Amid rapid progress in television technology and dramatic presentation technique, special video effects, including the use of blinking light and rapid change in scene as seen in animation programs, are now being used in an increasing frequency. When a human examines the video by feeding it one frame at a time to detect such special effects and if the check can be made at a speed of one frame per second, checking a two-hour movie will take 48 hours, which makes it physically impossible to examine all video programs to be broadcast.

Under these circumstances, conventional methods and apparatus use a subliminal image detecting device, such as disclosed in JP-A-9-74575, by taking advantage of the fact that frames making up a scene with blinking light, or a flicker scene, can each be regarded as a short-duration shot.

In the above-described conventional technology, when extracting local features of a video, it is possible to detect parts of the video whose feature quantity exceeds a predetermined reference level. However, because the user cannot know the actual feature quantities of the extracted frames or static images, he or she cannot guess to what extent the frames in question exceed the reference value. Further, in a flicker scene that consists of a large number of static images representing local features, although a list of these static images is displayed, it is difficult for the user to determine the range of the flicker scene.

SUMMARY OF THE INVENTION

It is therefore an object of the present invention to allow the user of the system to compare the feature quantities of local features with reference values with ease by displaying their actual quantities. Further, it is another object of the present invention to class the local features according to detection factors of special effects and detection times and display a list of the contents of the local features thus classified to enable easy comprehension of their contents.

The above objective is achieved by extracting a first static image and a second static image from a video made up of a plurality of static images; calculating a feature quantity of the first static image and a feature quantity of the second static image; detecting the second static image having a feature quantity such that a difference between the feature quantity of the first static image and the feature quantity of the second static image satisfies a predetermined condition; and displaying the detected second static image and the difference of the feature quantity in one-to-one correspondence. The feature quantity described above may be the one associated with a flicker scene of the video (such as average brightness, color distribution information, average RGB value, etc.). The feature quantity may be a brightness of the static image or a percentage of a red component in the static image. The second static image may be a static image consecutive to the first static image in the video. The step of displaying the detected second static image and the difference of the feature quantity in one-to-one correspondence may further display a time identifying the second static image (such as detection time, video playback time, or elapsed time after the start of video playback) in one-to-one correspondence with the second static image.

The above objective is achieved by extracting static images from a video made up of a plurality of consecutive static images; calculating feature quantities of the static images of the video that constitute a flicker scene; detecting static images constituting a flicker scene according to differences in the feature quantity between the static images and their preceding or subsequent static images; storing and managing the detected static images and the feature quantities; and displaying the static images and the feature quantity differences in one-to-one correspondence. The detected static images may be classified into a group according to whether their detection intervals are equal to or less than a predetermined value. The detected static images are classified into a group according to whether the number of their detections per second is equal to or higher than a predetermined value.

Further, the above objective is achieved by an apparatus for detecting local features of video, which has a display for displaying the video and which comprises: a means for calculating feature quantities of static images included in the video; a means for detecting static images whose feature quantities meet a predetermined condition; and a means for displaying on the display the detected static images and information on the feature quantities in one-to-one-correspondence. The display may display the detected static images, the information on the feature quantities and times identifying the static images (such as detection time, video playback time, or elapsed time after the start of video playback) in one-to-one correspondence with one another. The display may classify the detected static images into a group according to whether their detection intervals are equal to or less than a predetermined value and then display the classified group. The display may classify the detected static images into a group according to whether the number of their detections per second is equal to or greater than a predetermined value.

The functions implemented by the above-described method and apparatus may be provided either in the form of a recording medium that stores a video local feature detection program or in the form of a video local feature detection program recorded in a recording medium that can be executed by computer.

Other feature quantities of video include:

(1) a brightness difference in percentage between a static image of interest and the one immediately preceding it;

(2) a brightness difference in percentage between a static image of interest and the one immediately preceding it which is small when the two consecutive static images are compared in terms of overall average brightness but which is large when they are compared at the same dot positions;

(3) the number of same short-duration static images detected, such as subliminal foreign images;

(4) a point of logical change in video; and (5) an area in percentage of red-component dots, as determined from HSI value (hue, chroma and brightness)

DESCRIPTION OF THE EMBODIMENTS

Now, one embodiment of the present invention will be described in detail with reference to the accompanying drawings.

Figure 1:
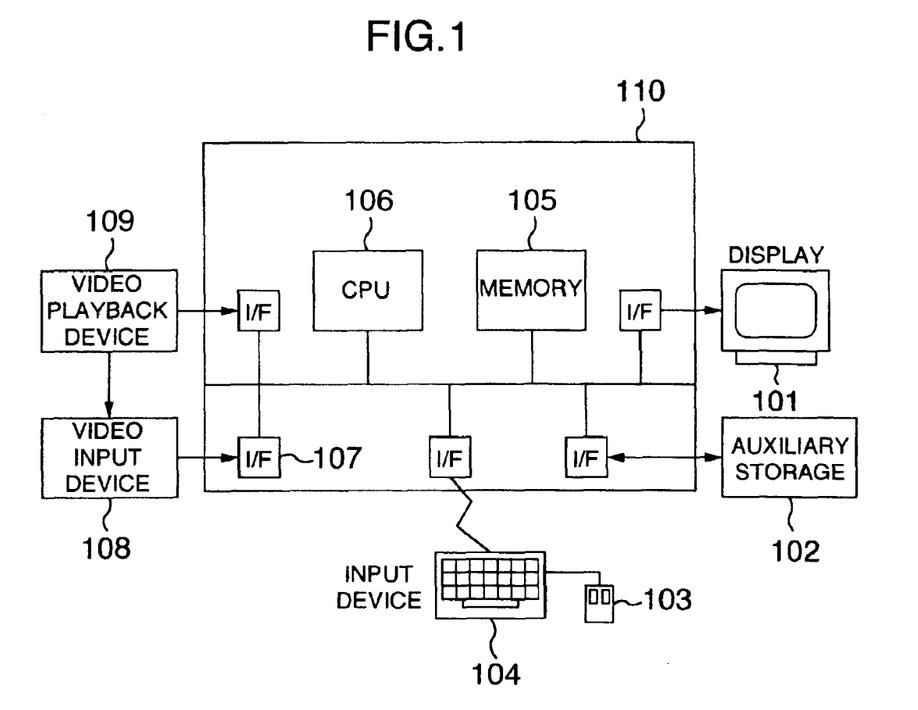
FIG. 1 is a schematic block diagram showing a system configuration according to the present invention.

FIG. 1 is a schematic block diagram showing an example system configuration that implements the present invention. Denoted 101 is a display such as CRT which displays outputs from a computer 110. Instructions to the computer 110 are entered from an input device such as keyboard 104 or mouse 103. A video playback device 109 is a tuner device for receiving programs broadcast by terrestrial broadcasting, satellite broadcasting and cable television, or a device for replaying a moving picture stored in an optical disk or video tape. Instructions to the computer 110 may also be given by this video play back device. A video signal output from the video playback device is fed to a video input device 108 such as capture board that converts each frame of the video into a digital static image, which is then sent to the computer 110. In the computer, the digital static image is loaded into a memory 105 and processed by a CPU 106 according to a program stored in the memory 105. Various information such as the digital static images and the result of CPU processing can be stored in an auxiliary storage 102 according to the contents of the CPU processing. Next, the CPU processing will be detailed in the following.

Figure 2:
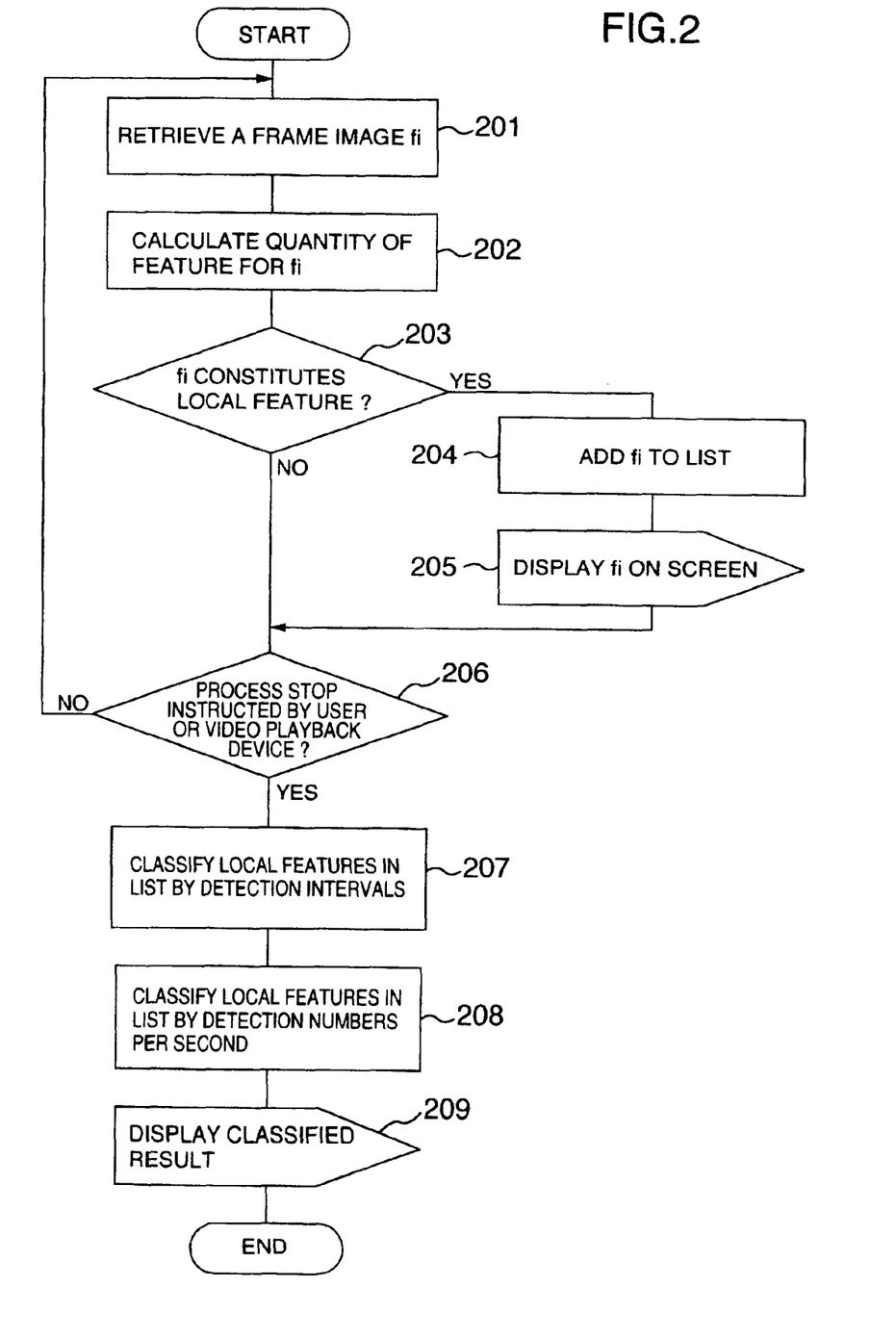
FIG. 2 is a flow chart of a program for detecting local features according to the present invention.

FIG. 2 is an example flow chart of a local feature detection program executed on the system of FIG. 1.

The program is stored in the memory 105 of FIG. 1 and executed under the following conditions.

(1) The user specifies the start of the detection processing by the mouse 103 or keyboard 104 of FIG. 1.

(2) The video playback device 109 of FIG. 1 instructs the start of the detection processing.

When the program is executed, it takes in digital static images fi from the interface 107 of FIG. 1 (201). Next, the program calculates the following feature quantities and stores them in the memory 105 of FIG. 1 (202).

202-(1): This step determines an average luminance or brightness of each digital static image fi. The average brightness thus obtained is used to detect a feature quantity representing a brightness difference in percentage between a static image of interest and the one immediately preceding it.

202-(2): This step divides each digital static image fi into blocks in a grating arrangement and determines an average brightness for each block. The average brightness thus obtained is used to detect a feature quantity that represents a brightness difference in percentage between a static image of interest and the one immediately preceding it which is small when the two consecutive static images are compared in terms of overall average brightness but which is large when they are compared at the same dot positions.

202-(3): This step determines information on color distribution of each digital static image fi. The color distribution information thus obtained is used for calculating, for example, an area in percentage of red component dots.

202-(4): This step divides each digital static image fi into blocks in a grating arrangement and determines an average RGB value for each block. The result thus obtained is used for detecting a short-duration scene, or shot, and a logical point of change in the video.

Based on the feature quantities calculated at step 202, it is determined in which of the following categories the digital static image fi falls (203).

203-(1): A category in which a difference between the feature quantities of digital static images fi and fi−1 obtained at step 202-(1) exceeds a predetermined threshold value. When the digital static image fi falls in this category, the local feature is based on the brightness difference in percentage between the static image and the one immediately preceding it.

203-(2): A category in which the feature quantities determined at step 202-(2) meet the following condition. When the digital static image fi falls in this category, the local feature is based on that brightness difference in percentage between the static image and the one immediately preceding it which is small when the two consecutive static images are compared in terms of overall average brightness but which is large when they are compared at the same dot positions.

A case where a difference in feature quantity between digital static images fi and fi−1 exceeds a predetermined threshold value.

A case where the number of blocks that have exceeded the threshold value is greater than a predetermined threshold value.

203-(3): A category in which the feature quantities obtained at step 202-(4) are used to calculate differences in feature quantity between digital static images fi and fi−1, between fi−1 and fi−2, and between fi and fi−2 and in which these feature quantity differences are in excess of a predetermined threshold value in a certain pattern. When the digital static images fall in this category, the local feature is based on a logical point of change in the video.

203-(4): A category in which the quantities of features obtained at step 202-(4) meet the following conditions. When the digital static images fall in this category, the local feature is based on a short-duration shot.

(a) A case where a difference between the feature quantities of digital static images fi and fi−1 is in excess of a predetermined value.

(b) A case where the static images Sj that satisfy the above condition (a) are stored in the memory 105 and the interval between a digital static image Sj of interest and a digital static image Sj−1 detected before is shorter than a predetermined threshold value.

Figure 4:
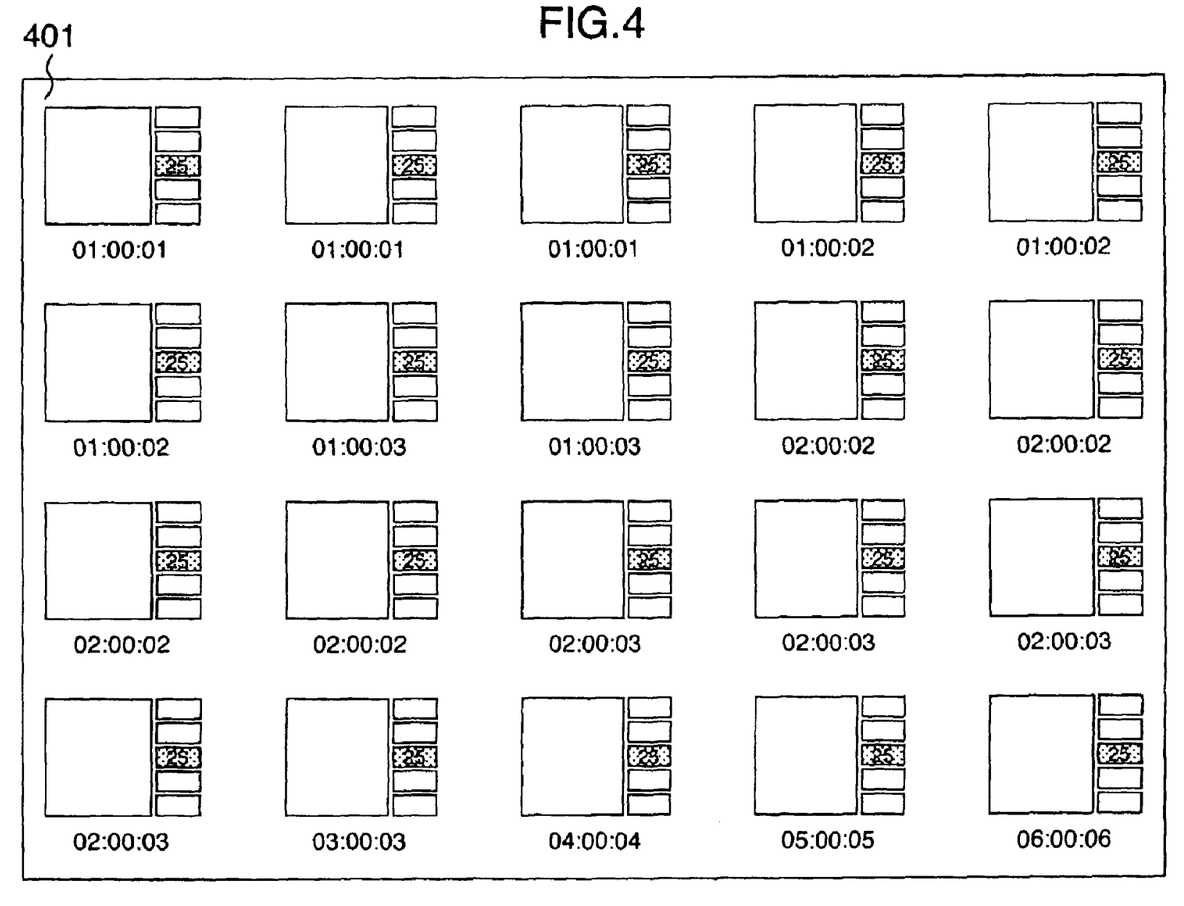
FIG. 4 is a schematic diagram showing a list of local features while being detected by a detection process according to the present invention.

When the above step 203 decides that the digital static image fi constitutes a local feature, the digital static image fi and its feature quantity are added to the list. The local features in this list are managed in the order that they are detected (204). Further, the digital static image fi is displayed on the display 101 of FIG. 1 in the form of an image list as shown in FIG. 4 (205).

By executing the steps 201 to 205, the processing on the digital static images fi is completed. This is followed by a decision on whether the processing on the next digital static image fi+1 is executed. When any of the following conditions is met, the detection processing is terminated and the program proceeds to step 207.

(1) The user specifies the end of detection processing by using the mouse 103 or keyboard 104 of FIG. 1.

(2) Termination of detection processing is instructed from the video playback device 109 of FIG. 1.

When during the above step 206 the detection processing is stopped, the local features registered in the list whose detection intervals are shorter than a predetermined threshold value are classified in a group (207). The step 207 will be detailed by referring to FIG. 8.

Figure 8:
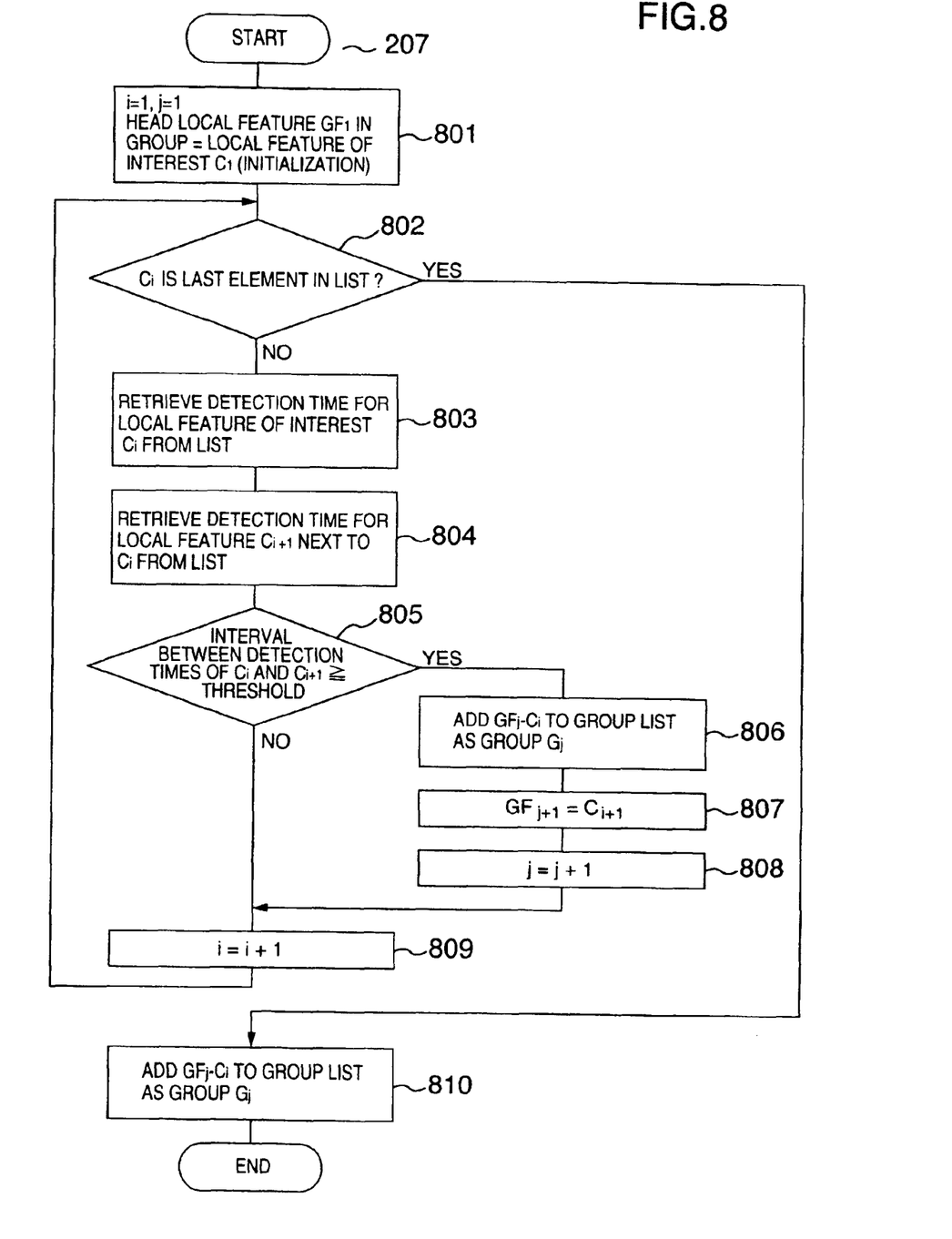
FIG. 8 is a flow chart of a program for classifying the local features according to the detection intervals according to the present invention.

The step 207 first initializes a variable (801) and then checks whether the local feature Ci is the last element in the list (802). When the result of the decision is YES, the local features in the group list from the head local feature GFj to the local feature of interest Ci are classed as a final group Gj and added to the group list (810). When the result of the decision is NO, the program performs steps 803 to 809 as an iteration (one loop of the processing). This part of processing first extracts the detection times of the local feature of interest Ci and the next local feature Ci+1 (803 and 804). Then it is checked whether the interval between the detection times of Ci and Ci+1 is longer than or equal to the threshold value (805). If the decision result is YES, an additional group is generated (806–808). This processing involves classifying the local features from the head local feature GFj to the local feature under consideration Ci as a group Gj, adding this group Gj to the group list (806), then setting the head of the next group to GFj+1 (807) and incrementing a group counter j (808). When the decision is NO, the processing does not generate an additional group and finally increments the list counter i (809) before returning to step 802. The step 207 is performed in this way.

Figure 9:
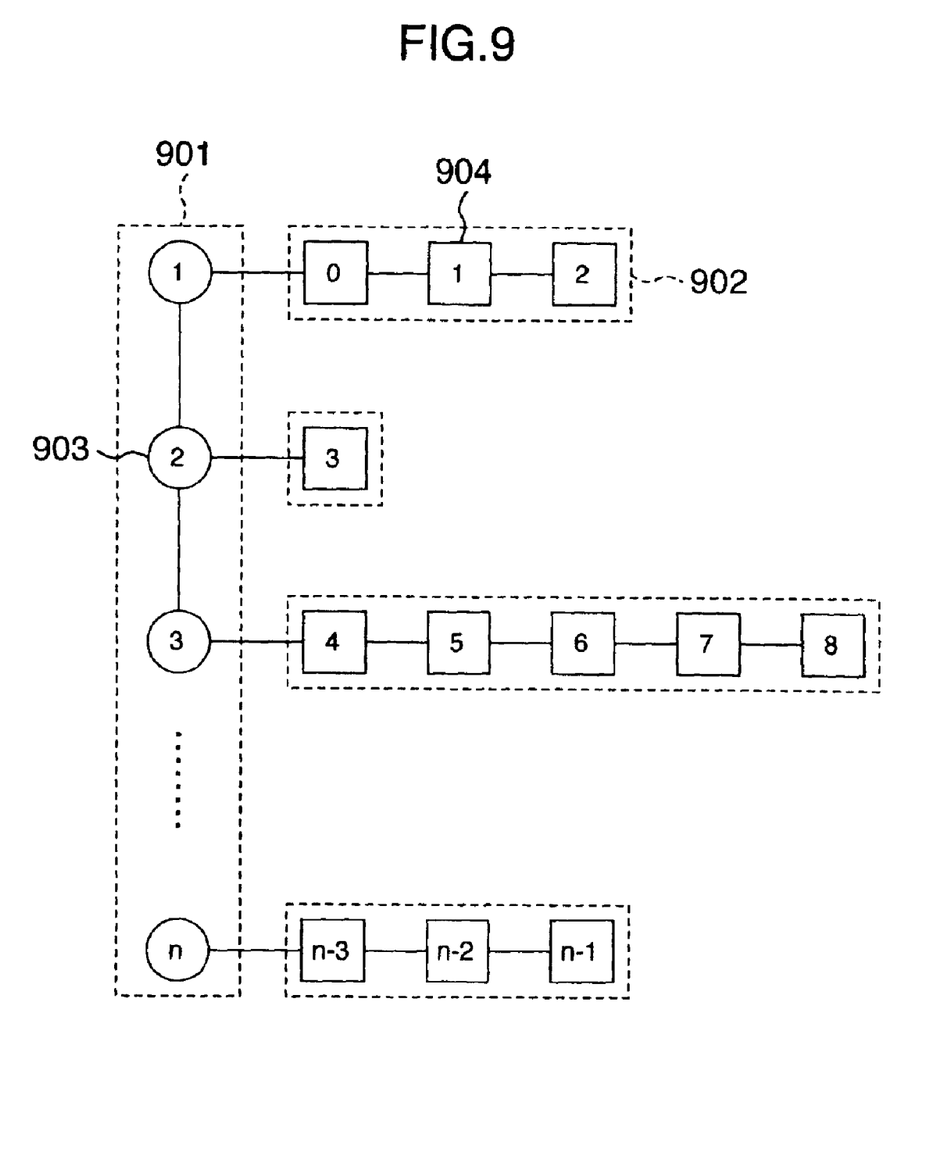
FIG. 9 is a diagram showing a configuration of a group list according to the present invention.

As a result of this processing, a group list as shown in FIG. 9 is generated. Designated 901 is a group list 901 showing groups, and 902 a group element list which shows a list of elements in one group. Denoted 903 is group elements. They are structured such that the group list 901 points to the group element list 902. The group element list 902 manages elements 904 containing information on local features (static image, feature quantity, time and other information).

Next, the local features in the group list generated by the step 207 are further classified into a group according to whether the number of times that they are detected in one second is equal to or greater than a predetermined threshold value (208). This processing searches for periods in which the local features are blinking and, when the list is displayed, allows the user to easily identify the flicker durations. The detail of the processing 208 will be explained by referring to FIGS. 10 and 11. The processing shown in the figures is for one group element list 902 and in effect is repetitively executed the number of times equal to the number of groups.

It is noted that only one of steps 207 and 208 can be executed. It is therefore possible to perform the processing 208 on the list described above and also classify the flicker duration and other periods into different groups.

Figure 10:
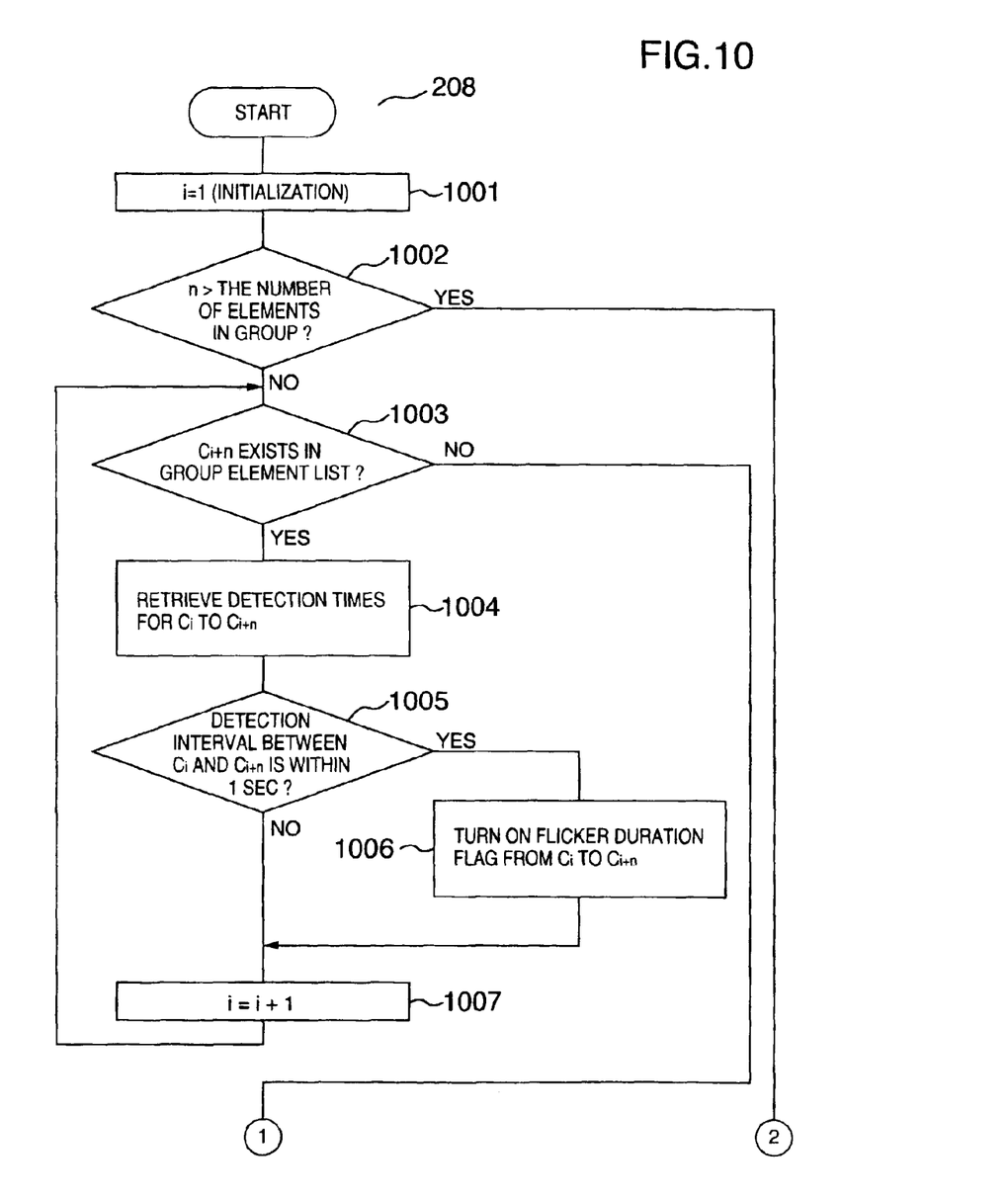
FIG. 10 is a flow chart of a program that classifies local features according to the number of times that the local feature is detected in one second.
Figure 11:
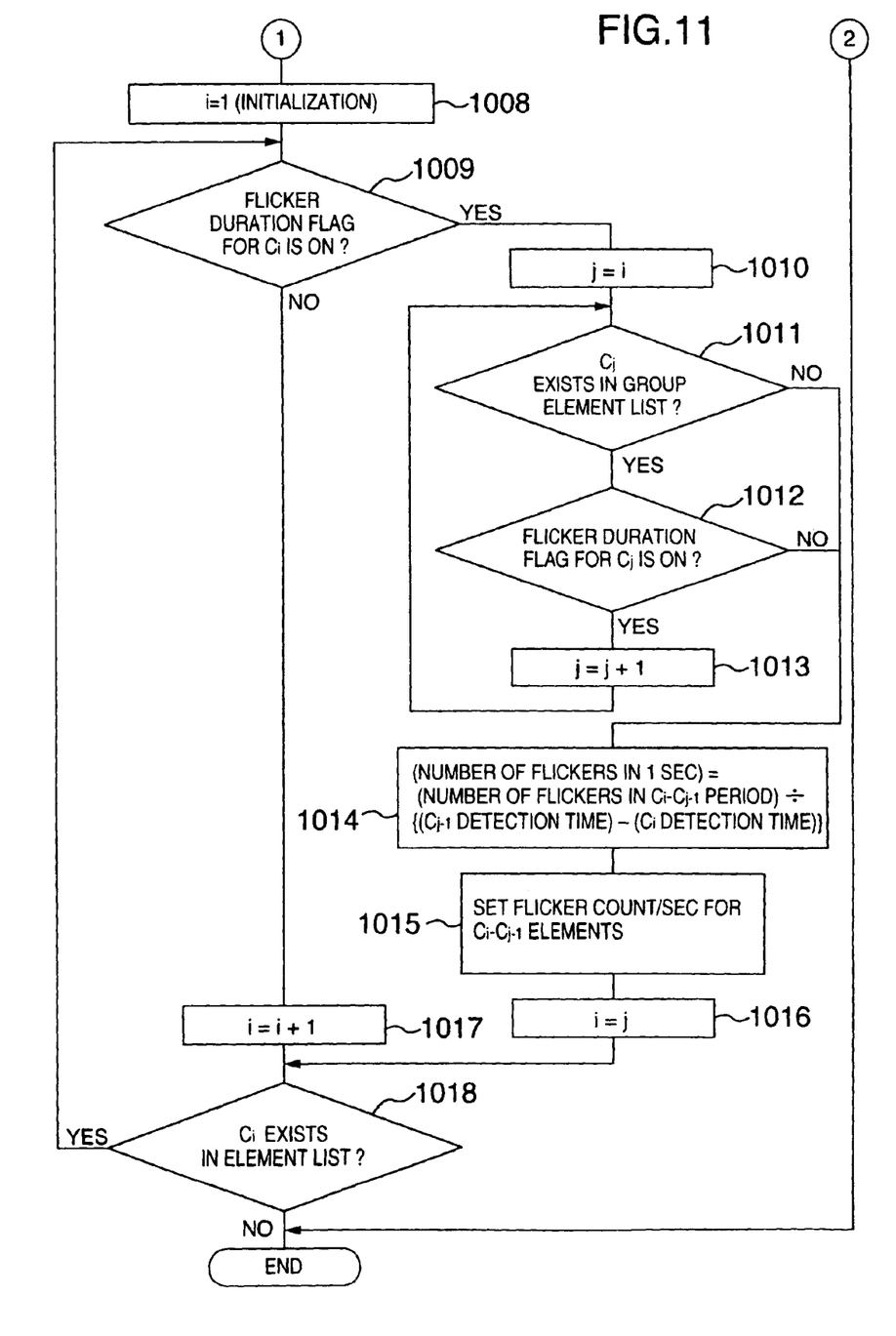
FIG. 11 is a flow chart of the program continued from FIG. 10.

This processing determines the range of flicker in the local features contained in one group element list by performing the steps in FIG. 10 and then calculates a flicker frequency in the flicker duration by performing the steps in FIG. 11.

First, the functions of blocks in FIG. 10 will be explained.

The first step in this processing is to initialize the variable (1001). Next, comparison is made between a predetermined threshold value n of the number of detections in one second and the number of elements in the group element list to determined whether n is larger than the number of elements (1002). If the decision result is YES, this group has no flicker duration and the processing is ended. If the decision result is NO, steps 1003 to 1007 search for a flicker duration. Next, the processing following the decision result of NO will be explained. First, a check is made to see if a local feature Ci+n exists in the element list (1003). If it is decided that the local feature Ci+n does not exist, which means that the flicker duration search has ended, the processing starts the steps shown in FIG. 11. When it is decided that the local feature Ci+n exists, the flicker duration search is continued. Next, processing for determining the flicker duration will be described. First, detection times for the local features Ci and Ci+n are retrieved (1004). Next, it is checked whether the detection interval between Ci and Ci+n is within 1 second (1005). If so, a flicker duration flag for Ci to Ci+n is turned on (1006). If not, nothing is done. Finally, the element counter i is incremented (1007). The search for the flicker duration is performed in this way.

Next, the functions of steps in FIG. 11 will be explained. First, the group element list counter is initialized (1008). Next, a check is made to see whether a flicker duration flag for the local feature Ci is on (1009). If the flag is on, which means that the start of a flicker duration is found, a search is made for the end of the flicker duration and the flicker frequency in that period is calculated (1010-1016). This processing first sets in a variable the start position at which to begin the search for the end position of the flicker duration (1010). Then, it increments j (1013) until Cj no longer exists in the group element list (1011) or until the flicker duration flag for Cj is turned off (1012) in order to determine the end Cj−1 of the flicker duration. Then, based on the search result, the number of times the blinking occurs in one second is calculated. (1014). The number of times the flicker occurs is set in additional information for Ci to Cj−1 (1015). With the number of flickers up to Cj determined, the start position j for the next flicker duration is substituted into i (1016). This initiates the calculation of a flicker frequency in the flicker duration.

When the step 1009 decides that the flicker duration flag is off, it increments the group element list counter i (1017). Finally it is checked whether Ci exists in the element list (1018). If it is found that no Ci exists, the processing of step 208 is completed. If Ci is found in the element list, the processing returns to step 1009 where it searches for a start point of the next flicker duration. The processing of step 208 is performed in this manner.

Figure 5:
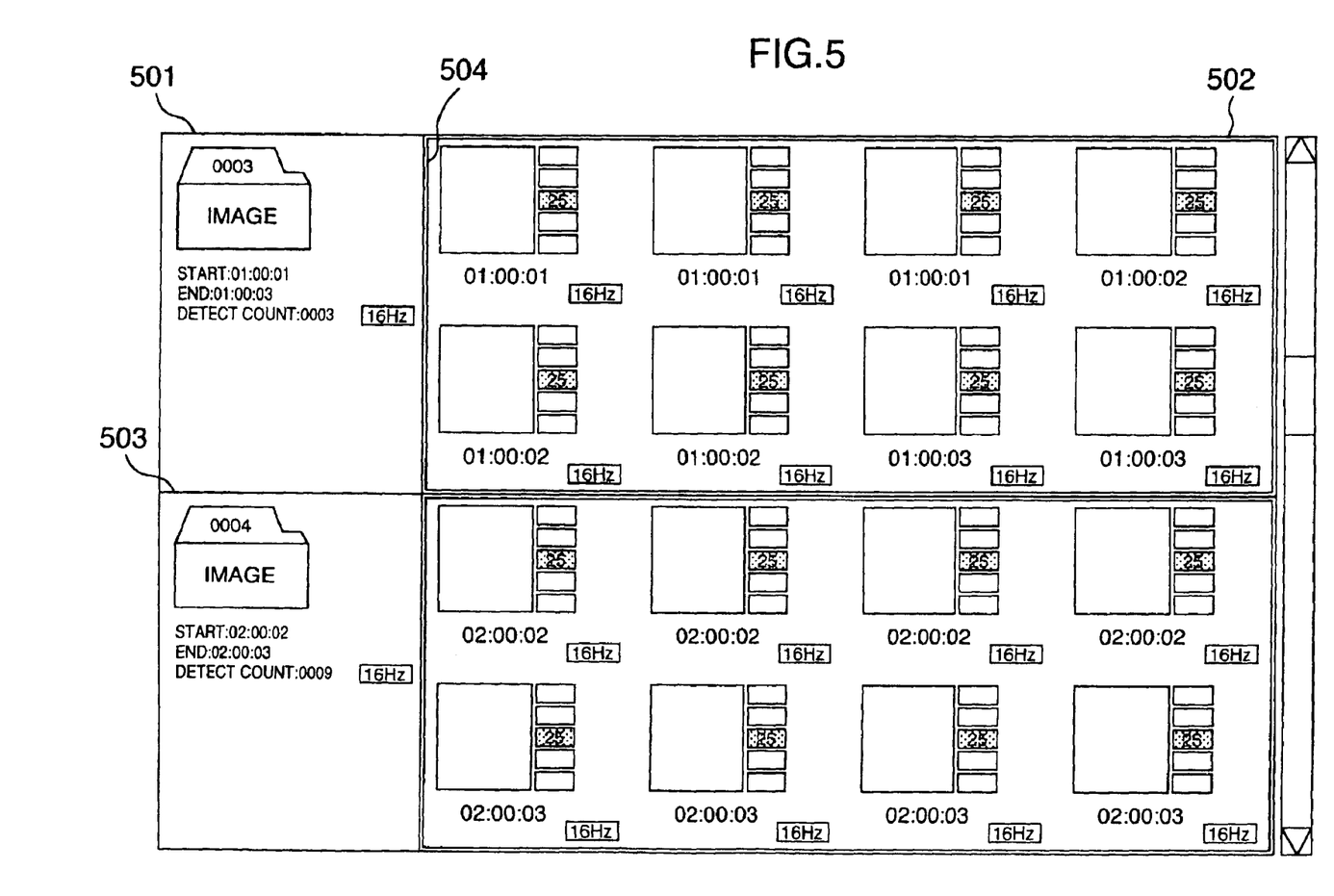
FIG. 5 is a schematic diagram showing a list of local features after the detection process is finished according to the present invention.

Finally, the results of processing 207 and 208 are displayed on the display 101 of FIG. 1 in the form of list as shown in FIG. 5 (209). Next, the user interface of this system will be explained.

Figure 3:
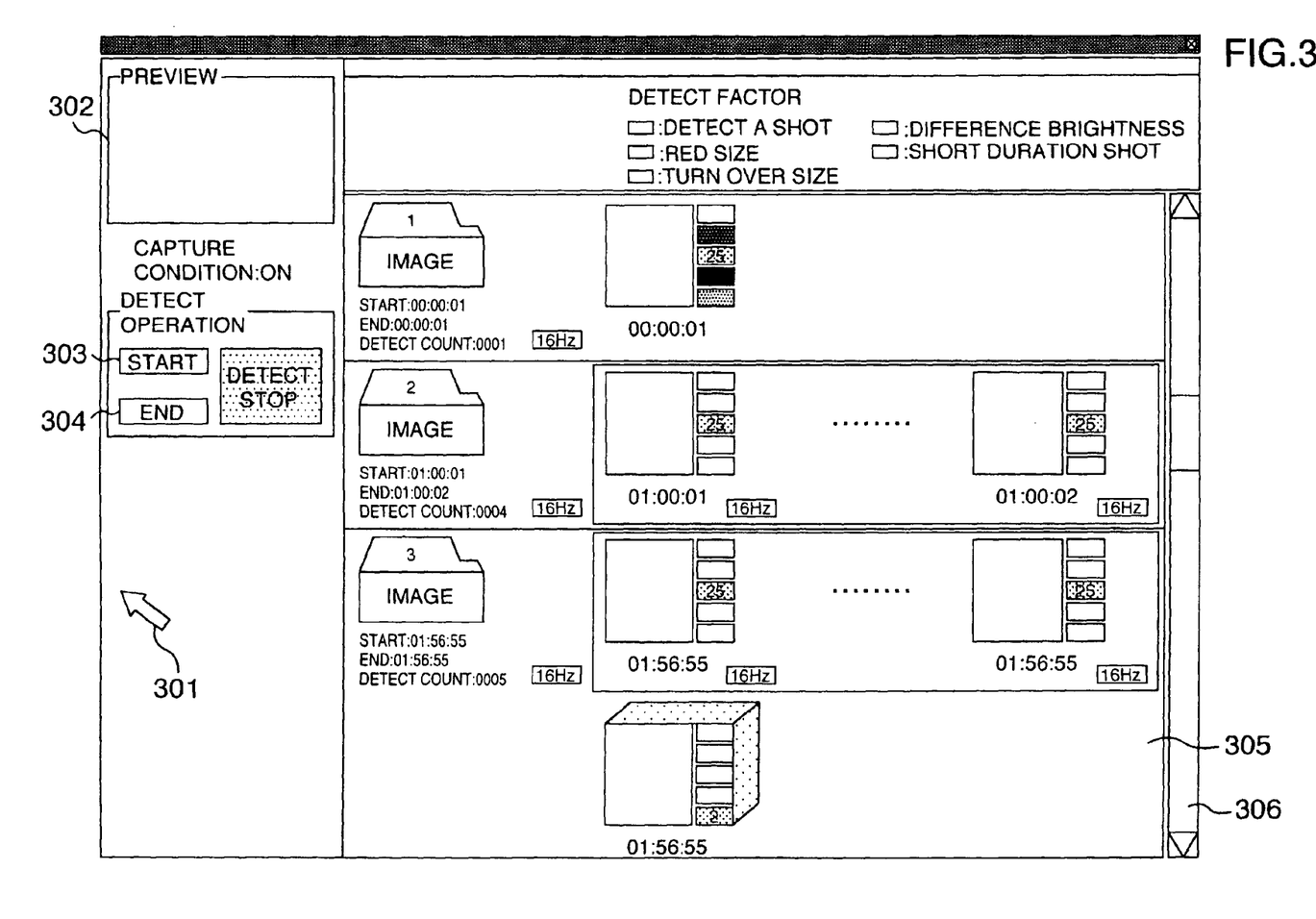
FIG. 3 is a schematic diagram showing a user interface of a system according to the present invention.

FIG. 3 shows an example user interface of the system that executes the program of FIG. 2.

This user interface is displayed on the display 101 of FIG. 1. Next, the user interface will be described in detail.

Reference number 301 represents a mouse pointer. Using the mouse 103 or keyboard 104 of FIG. 1, the user moves the mouse pointer to click on a desired position on the user interface.

302 is an area for displaying the video to be examined.

303 is a detect operation start button. Pressing this button with the mouse pointer will cause the program of FIG. 2 to be executed.

304 is an end button which, when pressed with the mouse pointer, will terminate the detect operation of the program of FIG. 2.

305 is an area for displaying a list of local features. The local features detected by the program of FIG. 2 are displayed here in the form of list. The local features are displayed as shown in FIG. 4 while the detection processing is in progress and, after the detection processing is finished, are displayed as shown in FIG. 5.

306 is a scroll bar, which is used to display that part of the detection result which overflows the range of the list display area 305.

As for the buttons and scroll bar used in the user interface, those of conventional technology will serve their purpose and are not detailed here. Next, a method of displaying a list of detection result will be explained.

FIG. 4 shows one example method of displaying a list of the check result while the detection processing is in progress. When local features are found, they are displayed successively beginning with a position 401.

FIG. 5 shows one example method of displaying a list of detection result after the detection process is finished.

501 represents a group icon display area, which shows information on the group that was classified according to the local feature detection interval by the program of FIG. 2.

502 represents an icon display area for displaying local features belonging to the group as classified by the program of FIG. 2.

503 represents a boundary between groups.

504 represents a boundary between the group icon display area and the icon display area. Next, the icon and the group icon will be explained.

Figure 6:
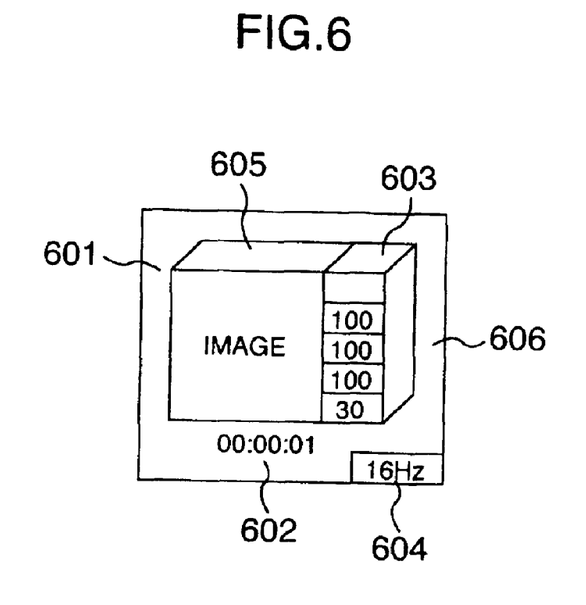
FIG. 6 is a diagram showing an icon representing a local feature and a feature quantity according to the present invention.

FIG. 6 illustrates an example of icon. The icon shows a local feature, a feature quantity and a detection time.

601 shows a digital static image that constitutes a local feature.

602 shows a detection time of the local feature.

603 is an area showing the feature quantity of the local feature. One block of this area represents a unit feature quantity which, when the local feature is detected at this quantity, is painted with a specific color and also shows a numerical value of the feature quantity of the image. This allows a person to quickly identify the factor by which the element of the local feature was detected.

604 is an area showing a frequency that represents the number of detections per second when the local features are classified by the processing 208 of the program of FIG. 2.

605 indicates by the thickness of the image that the same image appears consecutively when the local features are detected according to the factor or condition of 203-(4) by the program of FIG. 2.

606 is a background of the icon. When 604 is displayed, the background of the icon is painted in a color such as red, thus allowing the user to quickly identify this image as a local feature.

Figure 7:
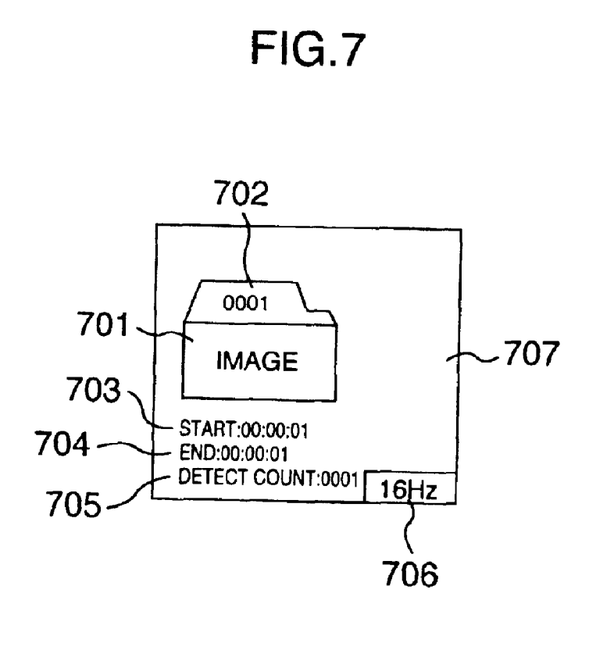
FIG. 7 is a group icon representing information on a group classified according to a local feature detection interval according to the present invention.

FIG. 7 shows a group icon representing the information on a group classified according to the local feature detection intervals.

701 represents a local feature of the start icon in the group.

702 represents a serial number of the group.

703 represents a detection time of the start icon in the group.

704 represents a detection time of the last icon in the group.

705 represents the number of icons belonging to the group.

706 represents an average number of detections per second in the group as determined from the information of 703, 704 and 705.

707 represents a background of the group icon, which is painted in a color such as red when this group of icons includes the local features classified by the processing 208. In this way the local features are identified by the above-described processing method and displaying method.

By detecting local features and displaying the detected local features in the form of list, this invention enables the user to easily identify the contents of the local features.

What is claimed is:

1. A method of detecting local features of a video, comprising:

extracting static images from a video made up of a plurality of consecutive static images;

calculating a plurality of different feature quantities of each of the static images, the feature quantities relating to a flicker scene of the video;

calculating respective differences in the feature quantities between the static images and their preceding or subsequent static images;

detecting static images constituting the flicker scene according to the respective differences in the feature quantities between the static images and their preceding or subsequent static images;

registering the detected static images with detected times and the feature quantities in a list in order of detection;

after the process of detecting static images, extracting a first static image registered on a top of the list;

extracting a second static image registered after the first static image;

when the difference between the first static image detection time and the second static image detection time is less than a predetermined value, adding the first and second static images to a first group;

when the difference between the first static image detection time and the second static image detection time is equal to or bigger than the predetermined value, adding the second static image to a second group;

displaying the static images belonging to the first group with the feature quantities by which the static images are detected on a first area on a screen; and displaying the static images belonging to the second group with the feature quantities by which the static images are detected on a second area on a screen.

2. A method of detecting local features of a video according to claim 1, wherein the plurality of different feature quantities include a brightness of the static image.

3. A method of detecting local features of a video according to claim 1, wherein the plurality of different feature quantities include a percentage of a red component in the static image.

4. A method of detecting local features of a video, comprising:

extracting static images from a video made up of a plurality of consecutive static images;

calculating a plurality of different feature quantities of each of the static images;

calculating respective differences in the feature quantities between the static images and their preceding or subsequent static images;

detecting static images according to the respective differences in the feature quantities between the static images and their preceding or subsequent static images;

registering the detected static images with detected times and the feature quantities in a list in order of detection;

checking positions of the list where the detection time interval between two adjacent static images in the list is equal to or bigger than a predetermined value, whereas passing over positions of the list where the detection time interval between two adjacent static images in the list is less than a predetermined value;

dividing the list at the checked positions into groups; and displaying the static images belonging to respective groups with the feature quantities by which the static images are detected on respective areas on a screen.

5. A method of detecting local features of a video according to claim 4, wherein the plurality of different feature quantities include a brightness of the static image.

6. A method of detecting local features of a video according to claim 4, wherein the plurality of different feature quantities include a percentage of a red component in the static image.

7. An apparatus for detecting local features of a video comprising:

means for extracting static images from a video made up of a plurality of consecutive static images;

means for calculating a plurality of different feature quantities of each of the static images, the feature quantities relating to a flicker scene of the video;

means for calculating respective differences in the feature quantities between the static images and their preceding or subsequent static images;

means for detecting static images constituting the flicker scene according to the respective differences in the feature quantities between the static images and their preceding or subsequent static images;

means for registering the detected static images with detected times and the feature quantities in a list in order of detection;

means for extracting a first static image registered on a top of the list after the process of detecting static images;

means for extracting a second static image registered after the first static image;

means for adding the first and second static images to a first group when the difference between the first static image detection time and the second static image detection time is less than a predetermined value;

means for adding the second static image to a second group when the difference between the first static image detection time and the second static image detection time is equal to or bigger than the predetermined value;

means for displaying the static images belonging to the first group with the feature quantities by which the static images are detected on a first area on a screen; and means for displaying the static images belonging to the second group with the feature quantities by which the static images are detected on a second area on a screen.

8. An apparatus for detecting local features of a video according to claim 7, wherein the plurality of different feature quantities include a brightness of the static image.

9. An apparatus for detecting local features of a video according to claim 7, wherein the plurality of different feature quantities include a percentage of a red component in the static image.

* * * * *